United States Patent [19]

Mitsuda et al.

[11] Patent Number: 5,100,473
[45] Date of Patent: Mar. 31, 1992

[54] PROCESS FOR PRODUCING HARDENED MATERIALS FROM COMBUSTION ASH OF FLUIDIZED BED

[75] Inventors: Susumu Mitsuda, Harima; Yasunori Shibata, Kodera; June Tatebayashi, Takarazuka, all of Japan

[73] Assignee: Kawasaki Jukogyo Kabushiki Kaisha, Hyogo, Japan

[21] Appl. No.: 210,837

[22] Filed: Jun. 24, 1988

[30] Foreign Application Priority Data

Jun. 25, 1987 [JP] Japan ................. 62-158981

[51] Int. Cl.$^5$ ............ C04B 18/08; C04B 18/06; C04B 7/26; C04B 2/04
[52] U.S. Cl. ................... 106/705; 106/707; 106/710; 106/DIG. 1
[58] Field of Search ............. 106/405, 109, DIG. 1, 106/85, 705, 710, 707; 405/129; 110/342, 344

[56] References Cited

U.S. PATENT DOCUMENTS

| | | | |
|---|---|---|---|
| 2,833,659 | 5/1958 | Bauer | 106/DIG. 1 |
| 4,353,749 | 10/1982 | Ray et al. | 106/109 |
| 4,603,037 | 7/1986 | Yoon | 423/242 A |
| 4,659,385 | 4/1987 | Costopoulos et al. | 106/DIG. 1 |
| 4,756,761 | 7/1988 | Philip et al. | 106/DIG. 1 |
| 4,770,831 | 9/1988 | Walker | 106/DIG. 1 |
| 4,804,147 | 2/1989 | Hooper | 106/DIG. 1 |

FOREIGN PATENT DOCUMENTS 143856  6/1987  Japan .

*Primary Examiner*—Michael Lewis
*Assistant Examiner*—Stephen G. Kalinchak
*Attorney, Agent, or Firm*—Wenderoth, Lind & Ponack

[57] ABSTRACT

The present invention relates to processes for producing a material usable as a suitable civil engineering and construction material by treating a combustion ash formed by the combustion of a fluidized bed comprising a coal as the fuel and limestone as a desulfurizing agent. In this process, quick lime contained therein is sufficiently slaked at first by addition of water and heat thus generated is released to prevent disintegration of the product, and then the product is subjected to atmospheric pressure steam treatment to obtain a product of high strength in a short time.

8 Claims, No Drawings

PROCESS FOR PRODUCING HARDENED MATERIALS FROM COMBUSTION ASH OF FLUIDIZED BED

BACKGROUND OF THE INVENTION

1. Field of the Invention

The present invention relates to a process for producing hardened granules having a high bulk density and a high strength which do not adhere to each other in a short time from an ash (comprising a coal ash and used desulfurizing agent) formed by combustion of a fluidized bed comprising a coal as the fuel and limestone as the desulfurizing agent and to a process for producing a ground material having a high CBR value by pulverizing the granules.

2. Prior Art

Recently in many countries including Japan, it is difficult to secure the import of a great amount of petroleum because of a worldwide unstable supply of petroleum since the petroleum crisis. Under these circumstances, the development of a fuel usable as an energy source in place of the petroleum in order to reduce the dependence on the petroleum in the supply and demand of energy is an important problem from a national point of view. Coal energy thus attracts public attention.

Coal as a fuel has been combusted heretofore mainly by a pulverized coal combustion process. However, recently, the fluidized bed combustion process is attracting attention. In the fluidized bed combustion process, the desulfurization is conducted usually in the furnace. Namely, in this process, a coal as the fuel and limestone as the desulfurizing agent are introduced into the furnace and a fluidized bed is formed in a boiler thereof. The fluidized bed combustion process is superior to the conventional pulverized coal combustion process for the following reasons: (1) a small volume of the furnace suffices, and the volume of the boiler may also be small, (2) the kind of the coal fuel is not strictly limited, (3) the combustion can be conducted at a temperature of as low as 750° to 850° C., troubles due to the coagulation of the ash do not occur and the formation of thermal $NO_x$ is only slight, and (4) the overall coefficient of heat transfer on the surface of a heat transfer water tube is high.

In putting the fluidized bed combustion technique to practical use, a problem of treatment of the ash is posed. The ash formed by the combustion of the fluidized bed comprises a limestone and the used desulfurizing agent. The used desulfurizing agent comprises II-type anhydrous calcium sulfate and unreacted quick lime. The amount of the limestone used is usually determined so that the molar ratio of Ca/S will be 3 to 6 in order to obtain a high efficiency of removing sulfur oxides from the coal combustion gas, i.e. a high desulfurization rate. By the reaction with the sulfur oxides conducted at 750° to 850° C., the limestone is converted into quick lime and II-type anhydrous calcium sulfate, which are discharged together with the coal ash. The amount of the ash formed by the combustion of the fluidized bed varies depending on the kind of the coal, desulfurization rate, operation conditions of the boiler, etc. The amounts of the coal ash, II-type anhydrous calcium sulfate and quick lime are about 15 to 20 wt %, 1 to 10 wt % and 1 to 10 wt %, respectively, based on the coal used.

The ash formed by the combustion of the fluidized bed is disposed of or utilized by the following processes:

(1) a moistening process wherein 10 to 40 parts by weight of water is added at once to 100 parts by weight of the ash to moisten the ash, the mixture is kneaded and then disposed of, (2) a moistening/granulation process wherein 20 to 50 parts by weight of water is added at once to 100 parts by weight of the ash and the mixture is kneaded to obtain granules to be disposed of, and (3) a moistening/granulation/steaming process wherein 20 to 50 parts of water is added in two portions to 100 parts by weight of the ash, the mixture is kneaded to obtain granules and the granules are treated with steam at 60° to 100° C. under atmospheric pressure.

However, the moistening process (1) has a drawback in that since the granules have a diameter of 0.01 to 100 mm and they are not sufficiently compacted, their bulk density is low, the quantity thereof carried in one load by a transportation means such as a truck or cargo boat is small and after it is used for the land reclamation, the density and strength of the reclaimed ground are low.

Although dense granules having a diameter of 0.5 to 50 mm can be obtained by the moistening/granulation process (2), this process has the following drawbacks:

(a) the granules adhere to each other because of the surface water thereof and, therefore, they cannot be handled easily, (b) the density of the product is not far higher than that of the kneaded product obtained in the moistening process, since granules having a diameter of less than 0.5 mm are scarcely contained therein, (c) the hydration reaction velocity is low, since it is conducted at ambient temperature, and the strength of the solid thus formed is not sufficiently increased and, as a result, the bearing capacity of the ground obtained by the reclamation with the solid is low, and (d) when the quick lime content is increased to 7.5 wt % or more, the granules are broken by a heat generated by slaking of the quick lime, since water is added at once before the kneading.

The moistening/granulation/steaming process (3) has the following disadvantages:

(a) the granules adhere to each other because of the surface water thereof and, therefore, they cannot be handled easily, (b) the density of the product is not far higher than that of the kneaded product obtained in the moistening process, since granules having a diameter of less than 0.5 mm are scarcely contained therein, and (c) the production cost is high, since the atmospheric pressure steam having a temperature of 60 to 100° C. is used for increasing the strength of the granules.

When the quick lime content of the ash is high, a heat is generated by the reaction thereof with water to frequently disintegrate the granules.

SUMMARY OF THE INVENTION

The present invention has been completed after investigations were made for the purpose of overcoming the above-mentioned problems. An object of the present invention is to provide a process for producing a hardened material having an improved handleability by kneading a coal ash together with water to form granules and covering the granules with coal ash containing quick lime so as to obtain a suitable granular size distribution and improved transportation efficiency and reclamation efficiency. In addition, in this process, the surface water of the granules is fixed by the reaction, taking advantage of the reactivity of the coal ash used for the coating. The strength of the granules can be increased by the generated heat in a short time. Further, the adhesion of the granules to each other can be prevented.

According to the present invention, water in an amount necessary for slaking the quick lime is added to the ash to conduct the slaking reaction prior to the kneading in order to prevent cracking of the granules induced by heat generated by the reaction of the quick lime and water, particularly when the quick lime content is high. After completion of the slaking reaction, water is further added thereto and the mixture is kneaded to form granules. The granules are cured with steam at 40 to 100° C. to further conduct the reaction and thereby to obtain a product of a higher strength. The granules thus obtained are pulverized to obtain a product like crushed stones, since the granules per se have a low CBR value and narrow angle of internal friction. The defects of the granules in the stirring/kneading step are thus overcome and material suitable for use as a roadbed material is obtained.

The major part of coal ash is formed by the combustion of pulverized coal in Japan. About 10 to 20 wt % thereof is a fly ash usable as a component to be mixed with a cement or as a starting material for the cement and the balance is thrown away in holes in the ground to be filled up in the reclamation. However, it will be impossible to sufficiently treat the increasing amount of coal ash by either the reuse there as the starting material for the cement or disposal thereof in a place of the reclamation.

Thus the management of an ash formed by the pulverized coal combustion poses a serious problem. Further, in the treatment of the fluidized bed combustion ash, it is a quite important problem for the practical utilization of the combustion techniques of fluidized beds to develop a particular process for the disposal of the fluidized bed combustion ash, since a great deal of such an ash will be formed when coal is used in the fluidized bed combustion systems in thermal power plants. The effective recycling of the fluidized bed combustion ash as resources is indispensable in the development of the process for managing a great quantity of the ash. In particular, since there are no rich resources in Japan, the ash should not be merely thrown away but should be recycled to save the resources and energies. Further, by the recycling, the environmental pollution can be prevented.

Processes for the production of hardened materials from a substance which is hardened by a hydration reaction such as a cement include two typical processes, i.e. press molding process and cast molding process. However, these processes necessitate a great number of molds which reduce their productivity and economical advantage.

After intensive investigations made for the purpose of developing a process for producing hard moldings having a high mechanical strength from fluidized bed combustion ash without necessitating any mold, we have found previously that a fluidized bed combustion ash comprising 60 to 85 wt % of coal ash, 10 to 25 wt % of lime and 5 to 25 wt % of calcium sulfate is hardened in a short time after kneading together with water. We have found further that this property of the ash can be utilized. That is, we have found that hard moldings having a high strength can be produced by the following process: the slump of the kneaded product is controlled to 0.5 to 10 cm. The kneaded product is placed on a conveyer such as a belt conveyer and cut into a specified size when the penetration resistance thereof becomes in the range of 5 to 20 kg. The pieces are cured at ambient temperature until the penetration resistance is increased to 30 kg or more and then they are treated with steam at 40° to 100° C. under atmospheric pressure. However, when the quick lime content is high, the temperature of the kneaded product becomes high due to the hydration reaction of the quick lime and a foam or foams is(are) formed in the moldings by the steam or the reaction proceeds too fast to form hard moldings having a sufficient strength. We have found a process for stably producing hard moldings having a high strength which comprises adding water in an amount required for slaking the quick lime to conduct the slaking reaction prior to the kneading, then adding water in an amount necessary for kneading to obtain a kneaded product and curing the product.

$\frac{1}{3}$ of the combustion ash discharged from the fluidized bed combustion boiler comprises coarse ash granules which are discharged directly from the bottom of the fluidized bed portion or overflow from the middle height of the boiler and the main component thereof is CaO. The balance ($\frac{2}{3}$) comprises a fly ash, i.e. gas entrained ash, collected in a dust collector, having a small particle diameter and mainly comprising lime ash (see Table 3).

We have found that a stable, hardened material can be produced by adding water in an amount necessary for slaking the quick lime to the fluidized bed ash which mainly comprises quick lime and which is in the form of coarse granules, stirring the mixture to convert the quick lime into slaked lime, releasing a heat thus generated and removing the heat by vaporization of water, and adding a fly ash thereto. It has also been found that the hardened granules obtained by the pulverization of the hardened molding is angular and it has a broad granular size distribution and a relatively low surface hardness and, therefore, it has a high ground bearing capacity.

The present invention has been completed on the basis of the above-described findings. An object of the present invention is to provide hardened moldings having a high mechanical strength and hardened granules having a high ground bearing capacity from the fluidized bed combustion ash so as to utilize a great quantity of the ash as resources in the civil engineering and construction industry.

DETAILED DESCRIPTION OF THE INVENTION

The invention of the present application in a first aspect thereof relates to a process for producing a hardened material from a fluidized bed combustion ash characterized in that water is added at once or in several portions to an ash formed by combustion of a fluidized bed comprising a coal as the fuel and a limestone as a desulfurizing agent, the mixture is kneaded to form granules having a diameter of mainly 0.5 to 50 mm, and 100 parts by weight of the granules are mixed with 5 to 20 parts by weight of a powdery combustion ash having a quick lime content of 7.5 to 40 wt %.

The invention of the present application in a second aspect thereof relates to a process for producing a hardened material from a fluidized bed combustion ash characterized in that water is added to a combustion ash formed by combustion of a fluidized bed comprising a coal as the fuel and a limestone as a desulfurizing agent, the amount of water being such that is necessitated for slaking a quick lime contained in the combustion ash, the mixture is kneaded, water in an amount necessary for kneading/granulation is further added thereto, the mixture is kneaded to form granules having a diameter of mainly 0.5 to 50 mm and the granules are treated with steam at 40° to 100° C. under atmospheric pressure to obtain the hardened material.

The invention of the present application in a third aspect thereof relates to a process for producing hardened materials by adding water to a combustion ash formed by combustion of a fluidized bed comprising a coal as the fuel and a limestone as the desulfurizing agent, kneading the mixture, controlling the slump of the kneaded mixture at 0.5 to 10 cm, cutting the kneaded mixture to a specified size when the penetration resistance thereof becomes in the range of 5 to 20 kg by the hydration reaction, curing the pieces at ambient temperature until the penetration resistance is increased to 30 kg or more and treating them with steam at 40° to 100° C. under atmospheric pressure, characterized in that the addition of water is conducted in such a manner that at first it is added in an amount necessary for slaking the quick lime and, after the slaking, it is added in an amount necessary for the kneading.

The combustion ash comprises a coarse ash mainly comprising coarse particles and a fly ash mainly comprising fine particles. An embodiment of the process of the present invention is characterized in that water is added to the ash collected in the dust collecter to slake quick lime contained therein and to release the heat generated, then the fly ash and water are added thereto and the mixture is kneaded.

Now, the first and the second aspects of the invention of the present application will be described.

When 100 parts by weight of the granules having a diameter of mainly 0.5 to 50 mm are mixed with 5 to 20 parts by weight of the coal ash or powder, the fine particles (the coal ash or powder) are distributed among the granules to increase the bulk density thereof and thereby increase the transportation efficiency and filling-up density in the land reclamation. When the amount of the coal ash is less than 5 parts by weight, the bulk density is not increased, since the amount of the fine powder is insufficient and, on the contrary, when it exceeds 20 parts by weight, the bulk density is lowered because of the excessive amount of the fine powder. When the diameter of the granules is less than 0.5 mm, the bridging rate of the granules becomes too high and a high bulk density cannot be obtained and, on the contrary, when it exceeds 50 mm, the fine powder cannot be sufficiently distributed in the spaces between the granules and, therefore, a high bulk density is not obtained.

When 100 parts by weight of the granules having a diameter of mainly 0.5 to 50 mm are mixed with 5 to 20 parts by weight of the coal ash or powder having a quick lime content of 7.5 to 40 wt %, the surface moisture on the granules is absorbed by the coal ash or powder to prevent the adhesion of the granules to each other and to improve the handleability. When the quick lime content of the coal ash or powder added is less than 7.5 wt %, the absorption of the moisture is insufficient and the granules adhere to each other. When the quick lime content exceeds 40 wt %, the ambient temperature is elevated and vaporization of water is accelerated to inhibit the solidification reaction and, therefore, the initial strength of the granules cannot be sufficiently increased and the handleability is insufficient.

When the quick lime content of the coal ash or powder is less than 7.5 wt %, the granules are not broken even if water is thrown therein at once. However, when the quick lime content is more than 7.5 wt %, a large quantity of heat is generated by the slaking of the quick lime and the temperature is elevated excessively to thereby break the granules. Therefore, 5 to 30 parts by weight of water is previously added to 100 parts by weight of the coal ash, the amount of water being varied within this range depending on the quick lime content. The mixture is thus moistened and then kneaded to slake a major part of the quick lime. Thereafter 15 to 45 parts of water is added thereto and the mixture is granulated. The disintegration of the granules by the heat of slaking of the quick lime is thus prevented.

Since, although the strength of the granules per se is enough for the handleability, it is yet unsatisfactory, the strength is increased by curing at 40° to 100° C. to conduct an ettringite-forming reaction. Since the granules formed by stirring and kneading are nearly spherical and have a low CBR value and a narrow angle of internal friction which are unsuitable for material for a roadbed, the granules are broken to obtain a crushed stone-like material suitable for use as the roadbed material.

When the coal ash and water are kneaded together, the following exothermic reactions occur:
(a) quick lime→slaked lime (slaking reaction), and
(b) coal ash+quick lime+anhydrous calcium sulfate→ettringite which is a main strength-keeping member of the solid.

In order to take advantage of these characteristics, the granules are mixed with the coal ash or powder. The surface moisture of the coal ash or powder gradually generates heat, since the surface moisture of the granules migrates to the powder. As a result, the environmental atmosphere around the granules has a high humidity and an elevated temperature. Therefore, the strength is increased without a steam treatment step and the handleability of the granules is improved. When the heat generation rate and quantity of heat generated are controlled by controlling the quick lime content, particle size and amount of the coal ash or powder to be mixed, the strength of the granules can be further increased. More specifically, when the quick lime content of the coal ash or powder is less than 7.5 wt %, the quantity of heat generated is insufficient and, therefore, the quick lime content must be increased to 7.5 wt % or higher by the addition of quick lime powder. When the quick lime content exceeds 40 wt %, the quantity of heat generated becomes large and a large amount of water is evaporated and, as a result, the amount of water becomes insufficient for the hydration reaction of the granules. Thus, a higher strength can be expected when the heat generation rate is controlled by varying the quick lime content, granular size and the mixing ratio of them depending on the quantity of heat released from the kneading machine and granule hopper. For obtaining a broken stone-like substance suitable for the use as the roadbed material, it is effective that the product is treated with steam at 40° to 100° C. to increase its strength and the granules thus obtained are crushed to obtain a crushed stone-like material.

The third aspect of the invention of the present application will now be described. In this aspect of the invention, water is added to the combustion ash, and the mixture is kneaded, then cured at ambient temperature and finally treated with steam at 40° to 100° C. under atmospheric pressure to obtain hard moldings. In this process, water is added in two portions. In particular, a specified amount of water is added at first to the ash to sufficiently slake the quick lime contained therein and a heat thus generated is released. Then an additional amount of water is added thereto and the mixture is sufficiently kneaded to obtain a kneaded mixture.

In an embodiment of this invention, water is added to the ash mainly comprising the coarse particles to conduct the slaking, then it is added to the ash mainly comprising the fine particles and the mixture is kneaded. In the fluidized bed combustion furnace, the coal is combusted in the bed. The ash thus formed and mainly comprising coarse particles having a particle size of 0.2 mm or larger or a specific surface area of 100 g/cm$^2$ or less is discharged from the fluidized bed as an overflow ash or a bottom ash. Said overflow ash is discharged from a middle height of the boiler in order to suitably maintain a height of the fluidized bed. Said bottom ash is discharged from the bottom of the boiler in order to prevent a poor fluidizing due to larger particles accumulated in the fluidized bed. Said overflow ash and bottom ash have an average particle size of about 1 mm.

On the other hand, the ash formed and mainly comprising particles of a smaller size flies and is collected as a multiclone ash or a bagfilter ash. Multiclone or bagfilter is a kind of dust collecter. Said multiclone ash has an average particle size of about 100–200$\mu$ and said bagfilter ash has a particle size of 44$\mu$ or less. These ashes are also called a fly ash.

The ash discharged from the bottom of the fluidized bed is coarse and the slaking reaction thereof proceeds only slowly. A specified amount of water is added thereto and after sufficient slaking and releasing the thus generated heat or removing the heat by steam formation, the fly ash is added thereto and the mixture is kneaded together with water.

For hardening the combustion ash in a short time, it is desirable to add, if necessary, quick lime and/or slaked lime, and II-type anhydrous calcium sulfate, calcium sulfate hemihydrate and/or calcium sulfate dihydrate in order to control the coal ash content in the range of 60 to 85 wt %, lime content in the range of 10 to 25 wt % and calcium sulfate content in the range of 5 to 25 wt %.

The slump value of the kneaded mixture thus obtained is 0.5 to 10 cm. After a penetration resistance of the mixture of 5 to 20 kg is attained by the procedure of the hydration reaction, the mixture is cut into a specified size and the pieces thus obtained are cured at ambient temperature until the penetration resistance is increased to 30 kg or more and then they are treated with steam under atmospheric pressure.

The term "slump value" herein is an index indicating the softeness of the kneaded mixture. It is determined by filling a slump cone (truncated cone having a size of an inner diameter at an upper end of 10 cm, an inner diameter at a lower end of 20 cm and a height of 30 cm with the mixture, immediately pulling the cone up vertically and measuring a reduction (cm) of the height at the center according to JIS A 1101 (slump test for concrete) as follows.

Method of Test for Slump of Concrete

1. Scope
This standard is applied to the slump test of concrete.
2. Test apparatus 2.1 Slump cone should be made of iron and has a dimension of an inner diameter at an upper end of 10 cm, an inner diameter at a lower end of 20 cm and a height of 30 cm. A grip should be attached to the cone at an adequate position.

2.2 A thrust bar should be made of round steel and has a dimension of a diameter of 16 mm and a length of 50 cm.

The top end thereof should be made semispherical in shape.

3. Sample
Samples should be collected according to the specification of JIS A 1115 (Method of sample collection of concrete not yet solidified) or should be made according to the specification of JIS A 1138 (Method of preparing concrete in a test room).

4. Test
4.1 Slump cone should be placed on a watertight flat plate, the inner surface of which should be wiped with a wet fabric and horizontally placed, and the sample should be packed into the cone by dividing into three layers in a substantially equal amount. After each layer should be levelled to make it compact by a thrusting bar, thrusted uniformly 25 times. When the separation of materials tends to cause by thrusting at this rate, the number of thrusting should be decreased to a degree that the separation is not caused. A thrusting of the thrusting bar in thrusting each layer should be in the extent that it substantially reaches to the preceding layer.

4.2 The time starting from packing concrete into the slump cone until completion of the packing should be within 3 minutes.

4.3 The upper surface of the concrete packed into the slump cone should be matched with the upper end of the slump cone to make even and thereafter the slump cone should be tranquilly and vertically taken up and a drop at the center of the concrete should be determined to make it "slump".

NOTE: The time for taking up slump cone should be 2 to 3 seconds at a height of 30 cm.

5. Result of test
Slump should be determined at an interval of 0.5 cm.
NOTE: 1. In the case of concrete wherein the maximum dimension of crude aggregate is 40 mm or more, crude aggregates having a dimension of 40 mm or more should be removed.

2. When the concrete becomes bias concerning the center axis of slump cone or collapses to become uneven shape, an additional test should be conducted with separate samples.

6. Reporting
Reporting should be made by describing necessary times in the following:
(1) Time
(2) Weather
(3) Ambient temperature
(4) Batch number
(5) Maximum dimension of crude aggregate
(6) Temperature of concrete
(7) Slump
(8) Miscellaneous The penetration resistance means a power necessary for penetrating into a steel column having an edge diameter of 50 cm into a depth of 2.5 mm.

Usually the composition of the fluidized bed combustion ash varies depending on the kind of the coal used. Namely, the proportion of the components such as $SiO_2$, $Al_2O_3$, CaO, $Fe_2O_3$, $Na_2O$ and $K_2O$ of the combustion residue varies depending on the place of production of the coal. Further, the type II anhydrous calcium sulfate (desulfurization product) content and quick lime (unreacted desulfurizing agent) content vary depending on sulfur content of the coal. Therefore, optimum conditions for production of hard granules vary depending on the composition of the fluidized bed combustion ash in the production of the hard moldings having a high strength from the ash by the treatment with steam. The main production conditions include the amounts of quick lime and/or II-type anhydrous calcium sulfate to be added if necessary, kneading conditions for obtaining the kneaded mixture with water which has a preferred slump value, cutting conditions, steam treatment conditions (temperature and time), etc.

However, these conditions become more stable by conducting the process in two steps, i.e. a step of slaking the fluidized bed ash mainly comprising quick lime and a step of kneading.

The relationship between the relative amount of the starting powder and the hardening property of the kneaded mixture or the properties of the hard moldings is roughly as follows: The main components of the hard moldings obtained after the steam treatment are ettringite ($3CaO.Al_2O_3.3CaSO_4.3H_2O$) and various calcium silicate hydrates ($XCaO.YSiO_2.ZH_2O$). Among them, ettringite acts as the best strengthening member. When the II-type anhydrous calcium sulfate content and/or quick lime content of the powdery starting mixture are(is) low, a long time is required for the hardening by the hydration reaction and the hardened material mainly comprises calcium monosulfoaluminate hydrate ($3CaO.Al_2O_3.CaSO_4.12H_2O$) and has a low strength. As the II-type anhydrous calcium sulfate content and/or quick lime content are(is) increased, the time required for the hardening by the hydration reaction is shortened, the amount of ettringite is increased and the strength of the hardened materials is increased. As the II-type anhydrous calcium sulfate content and/or quick lime content are(is) further increased, the time required for the hardening by the hydration reaction is remarkably shortened and free calcium sulfate and/or slaked lime which do not participate in the reaction in the treatment with steam are(is) formed to reduce the strength of the hardened materials. However, a problem of abnormal temperature elevation is not posed in this process, since water necessitated for slaking the fluidized bed ash mainly comprising quick lime is added prior to the kneading. For obtaining a hardening property suitable for the operation and a high mechanical strength of the hardened product after the steam treatment, the most preferred composition comprises 60 to 85 wt % of a coal ash free from quick lime and II-type anhydrous calcium sulfate, 10 to 25 wt % of quick lime and 5 to 25 wt % of II-type anhydrous calcium sulfate. When the quick lime content and/or II-type anhydrous calcium sulfate content are(is) less than the optimum one(s), the quick lime and/or II-type anhydrous calcium sulfate must be added. In such a case, slaked lime may be used as a substitute for quick lime and calcium sulfate hemihydrate and/or calcium sulfate dihydrate may be used as a substitute for the II-type anhydrous calcium sulfate. In the conventional hydration kneading process wherein a mixture of the fluidized ash comprising coarse particles with the fly ash comprising fine particles is subjected to the treatment, when the amount of the quick lime exceeds 30 wt %, the kneaded mixture is hardened within a quite short time to make the operation difficult. However, by adding water in an amount necessary for slaking the fluidized ash to conduct the slaking reaction previously, the problem of the abnormal temperature elevation is solved and the troubles caused by the hardening within a short time are overcome.

The kneading conditions suitable for obtaining a suitable slump value vary depending on mainly the specific surface area of the fluidized bed combustion ash determined by Blaine permeability method, ignition loss, quick lime content, etc. Usually a suitable slump value can be obtained with 50 to 65 wt % of water. When the slump value is less than 0.5 cm, the hardening time is too short for the operation and the strength of the hard materials is insufficient, since a large number of big cavities are formed therein. When the slump value exceeds 10 cm, the hardening time is prolonged to reduce the workability and also to reduce the strength of the hardened material. Therefore, the suitable slump value is in the range of 0.5 to 10 cm.

When the penetration resistance of the kneaded mixture is less than 5 kg, the sections of the pieces obtained by cutting adhere to each other in a short time, faces of them become round and the workability and quality of the hardened material are reduced. When it exceeds 20 kg, on the contrary, a high power is required for the cutting and the efficiency of the operation is reduced. Thus, the kneaded mixture is cut preferably while the penetration resistance is in the range of 5 to 20 kg.

The curing at ambient temperature is conducted in order to improve the workability and to inhibit the crack formation in the steam treatment conducted at 40° to 100° C. When the penetration resistance of the shaped material is less than 30 kg, the workability and the quality of the hardened material are unsatisfactory.

In the steam treatment conditions, the treatment temperature and time are most important. Usually when the steam treatment time is short or the steam treatment temperature is low, the hydrated hardened material is a mixture of calcium monosulfoaluminate hydrate, calcium sulfate dihydrate and ettringite, which mixture has a low strength. As steam treatment time is extended and/or the steam treatment temperature is elevated, the amount of ettringite formed is increased and the strength of the product is also increased. When the steam treatment time is long or the steam treatment temperature is excessively high, ettringite formed is decomposed into anhydrous calcium sulfate and calcium aluminate hydrate to reduce the strength of the hardened material, since ettringite has a poor heat resistance.

The optimum steam treatment conditions vary depending on the hydration reactivity of the combustion ash, etc. In case the fluidized bed combustion ash is used, a hardened material having a high strength can be obtained by the steam treatment carried at 50° to 80° C. under atmospheric pressure for 5 to 15 hrs. As the steam treatment temperature is elevated, the treatment time becomes short and the hardened material having a high strength is obtained. Thus in the production of the hard materials from the fluidized bed combustion ash, it is necessary to suitably select the amount of water to be added, timing of the cutting, curing conditions and steam treatment conditions depending on the properties of the ash.

When the hardened materials have a high strength, the are crushed by means of a crusher such as a jaw crusher, or impeller breaker to obtain hardened granules capable of exhibiting a high roadbed bearing capacity.

The hardened moldings obtained according to the present invention are usable as blocks for the shore protection works and the hardened granules obtained by the crushing of said moldings are usable as roadbed material, material for filling up holes in the ground and material for improving the ground.

When the hardened granules obtained according to the present invention are used as the roadbed material, filling-up material and ground-improving material, the following advantages are obtained: the weight per unit volume thereof is far less than that of crushed stones or pebbles used heretofore and the roadbed bearing capacity thereof is almost equal to that of the crushed stones or pebbles. The roads and holes in the ground filled up are usually wet or exposed to a high humidity. Under such conditions, the hardened granules obtained according to the present invention increase their load bearing capacity as the roadbed material.

The following examples and comparative examples will further illustrate the present invention but are by no means intended to limit the invention.

In Examples 1 to 6 and Comparative Examples 1 and 2, ash samples as shown in Table 1 were used.

TABLE 1

| Ash sample | Coal ash | Used desulfurizing agent | |
|---|---|---|---|
| | | Quick lime | Anhydrous calcium sulfate |
| A (Ash collected in dust collector) | 74 wt % | 16 wt % | 10 wt % |
| B [Overflow ash from main combustion fluidized bed furnace (MBC)] | 56 wt % | 27 wt % | 17 wt % |
| C (Ash collected in dust collector) | 92 wt % | 5 wt % | 3 wt % |

CBR herein indicates California Bearing Ratio of Solids according to JIS A 1211 (test for rate of capacity of bearing roadbed).

According to the general plan of asphalt pavement, corrected CBR is determined after immersing in water for 4 days. The value of CBR thus determined corresponds to 95% of the maximum dry density obtained by dividing the sample in thickness into three layers and tamping each layer down by ramming 92 times according to JIS A 1210 (method of earth consolidation test by ramming). CBR is determined from the penetration resistance to a penetrating rod having a diameter of 5 cm according to said JIS A 1211 according to the following formula:

$$CBR = \frac{\text{Load (kg) for 2.5 mm penetration}}{1370 \text{ (kg)}} \times 100 \text{ (\%)}$$

In the determination of CBR of the granules, they were not immersed in water and CBR of them was determined immediately after the ramming, since they are hydraulic.

The bulk density of the granules was determined by filling a cylindrical vessel having an inner diameter of 250 mm and a height of 410 mm with them (the amount being measured in kilograms) and calculating the value according to the following formula:

$$\text{Bulk density of granules (g/cm}^3\text{)} = \frac{\left[\text{Weight (g) of granules}\right]}{12.5^2 \pi \times 41 \text{ (cm}^2\text{)}} \times \frac{\left[\begin{array}{c}\text{Weight (g) of granules after}\\ \text{calcining 100 parts by weight}\\ \text{of them at 750}^\circ\text{ C. in reducing}\\ \text{atmosphere}\end{array}\right]}{100}$$

The crushing strength was determined by using granules having a diameter of 10 mm with Kiya's hardness tester. The angle of internal friction was determined as follows: a vessel (having an outer diameter of 50.8 cm, inner diameter of 30.8 cm and height of 10 cm) was filled up with the granules. A load was applied thereto to conduct shearing. The angle was calculated from the normal stress and the gradient of a straight line of the shear stress.

In the following Examples and Comparative examples, parts are given by weight.

EXAMPLE 1

10 parts of water was added to 100 parts of Ash A in the above Table 1. The mixture was kneaded for 1 min. and then 20 parts of water was added thereto. The mixture was kneaded for 3 min. to obtain granules having a diameter of 0.5 to 50 mm. 15 parts of Ash A was added thereto and the mixture was mixed for additional one minute and taken out from the kneader. The granules thus obtained were placed in a cylindrical vessel having an inner diameter of 250 mm and a height of 410 mm. One day after, the product was subjected to various tests to obtain the results shown in Table 2.

EXAMPLE 1-2

The product obtained in Example 1 was cured at 60° C. for 5 hrs under steam saturation condition. The product had an increased strength. The results are shown in column 1-2 in Table 2.

EXAMPLE 2

The product obtained in Example 1 was crushed by means of a roll crusher and the granular size distribution was adjusted according to The Standard on Crushed Stones of 1 to 30 mm Granular Size. The product was placed in a cylindrical vessel having an inner diameter of 250 mm and a height of 410 mm. One day after, the product was subjected to various tests to obtain the results shown in Table 2.

EXAMPLE 3

2 parts of water was added to 20 parts of Ash B. The mixture was kneaded for 5 min. 100 parts of Ash A and then 10 parts of water were added thereto and the mixture was kneaded for 1 min. 20 parts of water was added thereto and the mixture was kneaded for 3 min. to obtain granules having a diameter of 0.5 to 50 mm. 15 parts of Ash A was added thereto and the mixture was mixed for one min. and taken out from the kneader. The granules thus obtained were cured at 60° C. under steam saturation condition for 5 hrs and placed in a cylindrical vessel having an inner diameter of 250 mm and a height of 410 mm. One day after, the product was subjected to various tests to obtain the results shown in Table 2.

EXAMPLE 3-2

The product obtained in Example 3 was crushed by means of a roll crusher and the granular size distribution was adjusted according to The Standard on Crushed Stones of 30 mm or less Granular Size. The product was subjected to the various tests in the same manner as above. The results are shown in column 3-2 in Table 2.

EXAMPLE 4

10 parts of water was added to 100 parts of Ash A. The mixture was kneaded for 1 min. 20 parts of water was added thereto and the mixture was kneaded for 3 min. to obtain granules having a diameter of 0.5 to 50 mm. Further 10 parts of Ash A and 10 parts of Ash B were added thereto and the mixture was mixed for 1 min. and taken out from the kneader. The granules thus obtained were thrown into a cylindrical vessel having an inner diameter of 250 mm and a height of 410 mm. One day after, the product was subjected to various tests to obtain the results shown in Table 2.

EXAMPLE 5

15 parts of water were added to 80 parts of Ash A and 20 parts of Ash B. The mixture was kneaded for 5 min. 20 parts of water was added thereto and the mixture was kneaded for 3 min. to obtain granules having a diameter of 0.5 to 50 mm. 12 parts of Ash A and 3 parts of Ash B were added thereto and the mixture was mixed for 1 min. and taken out from the kneader. The granules thus obtained were thrown into a cylindrical vessel having an inner diameter of 250 mm and a height of 410 mm. One day after, the product was subjected to various tests to obtain the results shown in Table 2.

EXAMPLE 6

30 parts of water was added to 100 parts of Ash C. The mixture was kneaded for 3 min. to obtain granules having a diameter of 0.5 to 50 mm. A powdery mixture of 12 parts of Ash C and 3 parts of powdery quick lime was added thereto and the mixture was kneaded for 1 min. and taken out from the kneader. The granules thus obtained were thrown into a cylindrical vessel having an inner diameter of 250 mm and a height of 410 mm. One day after, the product was subjected to various tests to obtain the results shown in Table 2.

COMPARATIVE EXAMPLE 1

20 parts of water was added to 100 parts of Ash A. The mixture was kneaded for 2 min. and then taken out from the kneader. The mixture was thrown into a cylindrical vessel having an inner diameter of 250 mm and a height of 410 mm. One day after, the product was subjected to various tests to obtain the results shown in Table 2.

COMPARATIVE EXAMPLE 2

20 parts of water was added to 100 parts of Ash A. The mixture was kneaded for 1 min. 20 parts of water was added thereto and the mixture was kneaded for 3 min. to obtain granules having a diameter of 0.5 to 50 mm. The granules were taken out from the kneader and thrown into a cylindrical vessel having an inner diameter of 250 mm and a height of 410 mm. One day after, the product was subjected to various tests to obtain the results shown in Table 2.

TABLE 2

| | Removability from vessel | Crushing strength (kg) | Bulk density (g/cm$^3$) | Corrected CBR (%) | Angle of internal friction |
|---|---|---|---|---|---|
| Example 1 | easy | 3 | 0.85 | 45 | 30 |
| 1-2 | " | 15 | 0.85 | 70 | 35 |
| 2 | " | 3 | 1.1 | 55 | 45 |
| 3 | " | 18 | 0.95 | 85 | 30 |
| 3-2 | " | 18 | 1.1 | 120 | 45 |
| 4 | " | 4 | 0.90 | 40 | 35 |
| 5 | " | 2 | 0.90 | 40 | 35 |
| 6 | " | 2 | 0.92 | 45 | 35 |
| Comparative Example 1 | difficult | <0.5 | 0.55 | 25 | 35 |
| 2 | " | 1 | 0.70 | 30 | 35 |

In the following Examples 7 to 9 and Comparative Examples 3 and 4, an ash collected in the dust collector and overflow ash having chemical compositions and physical properties shown in Table 3 and comprising substances shown in Table 4 were used. The Blaine specific surface area was determined by air permeation method by means of SS-100 (a specific surface area measuring device for powder; a product of Shimadzu Seisakusho Ltd.)

TABLE 3

| | Composition (wt %) | | | | | | | | | Density (g/cm$^3$) | Blaine specific surface area (cm$^3$/g) |
|---|---|---|---|---|---|---|---|---|---|---|---|
| | SiO$_2$ | Al$_2$O$_3$ | CaO | Fe$_2$O$_3$ | Na$_2$O | K$_2$O | MgO | SO$_3$ | Ig Loss | | |
| Ash collected in dust collector | 32.1 | 14.7 | 23.3 | 4.58 | 0.41 | 0.77 | 0.67 | 5.65 | 17.6 | 2.57 | 6730 |
| Overflow ash | 8.84 | 2.17 | 63.9 | 0.86 | 0.09 | 0.17 | 0.53 | 19.3 | 4.0 | 2.97 | <100 |

TABLE 4

| | | Used desulfurizing agent | |
|---|---|---|---|
| | Coal ash | Quick lime | Anhydrous calcium sulfate |
| Ash collected in collector for fluidized bed combustion ash | 75.9 wt % | 14.5 wt % | 9.60 wt % |
| Overflow ash | 15.4 wt % | 49.0 wt % | 35.6 wt % |

COMPARATIVE EXAMPLE 3

60 parts by weight of water was added to a powdery mixture of 85 parts by weight of the ash collected in the dust collector (see Table 3) and 15 parts by weight of quick lime. The mixture was kneaded. However, the mixture began to be hardened in the course of the kneading to make the subsequent operation difficult.

COMPARATIVE EXAMPLE 4

60 parts of water was added to 100 parts by weight of the ash collected in dust collector as shown in Table 3. The mixture was kneaded for 1 min. After the penetration resistance became 5 kg, it was cut into pieces having a size of 40×40×160 mm. The pieces were treated with steam at 70° C. under atmospheric pressure until the penetration resistance became 10 kg for 10 hrs. The hard materials thus obtained had cracks formed therein and a low strength.

EXAMPLE 7

5 parts by weight of water was added to 100 parts by weight of the ash collected in dust collector as shown in Table 3. The mixture was kneaded for 1 min. 55 parts of water was added thereto. The mixture was kneaded for 1 min. After the penetration resistance became 10 kg, it was cut into pieces having a size of 40×40×160 mm (when water was added in two portions, i.e. a portion of water for slaking the quick lime nd another portion of water for the kneading, the time required for increasing the penetration resistance to 10 kg was about 20 min., while when water was added at once, the time required for increasing it to 10 kg was 30 to 60 min). The pieces were cured at ambient temperature to increase the penetration resistance to 30 kg (when water was added in two portions, i.e. a portion of water for slaking the quick lime and another portion of water for the kneading, the curing time at ambient temperature was reduced by 20 to 40 min., while when water was added at once, the curing time was 30 to 60 min.). They were treated with steam at 70° C. under atmospheric pressure for 10 hrs. The properties of the hard materials thus obtained (in wet state) were shown in Table 5.

TABLE 5

| Bulk density [g/cm$^3$] | Bending strength [kg/cm$^3$] | Compression strength [kg/cm$^3$] |
| --- | --- | --- |
| 1.71 | 50 | 210 |

EXAMPLE 8

The hard materials obtained in Example 7 were crushed by means of a jaw crusher to obtain hard granules having a granular size distribution of: 0% of those of more than 20 mm, 21% of those of 20 to 10 mm, 14% of those of 10 to 5 mm, 33% of those of 5 to 1 mm, 26% of those of 1 to 0.1 mm and 6% of those of smaller than 0.1 mm. The maximum dry density of the hard granules was 0.06 g/cm$^3$ and corrected CBR was 140%.

EXAMPLE 9

5 parts by weight of water was added to 33 parts by weight of the ash (overflow) shown in Table 3. The mixture was kneaded for 1 min. 67 parts by weight of the ash collected in the dust collector and 55 parts by weight of water were added thereto and the mixture was kneaded for 1 min. and poured over a flat plate. After the penetration resistance was increased to 10 kg, it was cut into pieces having a size of 40×40×160 mm. The pieces were cured at ambient temperature until the penetration resistance was increased to 30 kg and then treated with steam at 70° C. under atmospheric pressure for 10 hrs. The properties of the hard materials thus obtained (in wet state) were as shown in Table 6.

TABLE 6

| Bulk density [g/cm$^3$] | Bending strength [kg/cm$^3$] | Compression strength [kg/cm$^3$] |
| --- | --- | --- |
| 1.71 | 50 | 190 |

It is apparent from the above description, Examples and Comparative Examples that the granules having a diameter of 0.5 to 50 mm are mixed with the coal ash or powder in the present invention and, therefore, a high bulk density is obtained to prolong the life of the reclaimed ground, to inhibit the adhesion of the grains to one another and to improve the handleability.

Another advantage of the process is that since the coal ash or powder having a quick lime content of 7.5 to 40 wt % used as the ash mixture generates heat upon contact with water, the granules having a high strength can be obtained without the steam treatment step.

When the quick lime to be incorporated in an amount of 7.5 to 40 wt % in the coal ash is previously kneaded together with a small amount of water, the disintegration of the granules due to the slaking reaction of the quick lime can be inhibited and granules having a high strength can be obtained.

Therefore, the strength of the granules is increased before the steam treatment and the cracking in the handling is inhibited. Further since no free water is present on the surface, water condensed in the initial stage of the curing with steam is absorbed in the granules to reduce the trouble of readhesion during the curing with steam. By the steam curing, the strength of the granules and CBR value thereof can be improved. By the crushing to obtain a granular size distribution similar to that of crushed stones having controlled sizes, the angle of internal friction and CBR value can be remarkably improved.

Thus, by the processes of the first and the second aspects of the invention, materials having a CBR value and angle of internal friction sufficient for use as roadbed material are provided. The hardened material prepared by the process of the present invention is thus useful as a material for civil engineering such as a roadbed material.

The invention of the present application in its third aspect provides a process for producing a hardened material wherein a fluidized bed combustion ash formed by the fluidized bed combustion of coal fuel is used as the starting material, water in an amount necessitated for slaking quick lime in a coarse ash discharged from the fluidized bed portion is added thereto, then an ash collected in a dust collector is added thereto, the mixture is kneaded together with water, placed on a conveyer such as a belt conveyer and cut into a specified size after the penetration resistance becomes in the range of 5 to 20 kg, and the pieces are cured at ambient temperature until the penetration resistance is increased to 30 kg or more and then treated with steam at 40° to φ° C. under atmospheric pressure. By this process, the hard moldings having a high strength can be produced easily in a short time without necessitating any mold. By crushing these moldings, hardened granules having a high roadbed bearing capacity can be obtained. The application of this product as a civil engineering and construction material is expected. The techniques of the present invention are quite advantageous for the effective utilization of the fluidized bed combustion ash as a material in the civil engineering and construction industry.

What is claimed is:

1. A process for producing a hardened material from a fluidized combustion ash which comprises quicklime, which process comprises adding water to a combustion ash formed by combustion of a fluidized bed comprising a coal as fuel and limestone as a desulfurizing agent, the amount of water being added in two stages, wherein in the first stage the water is added in an amount sufficient to slake the quicklime in said ash but insufficient to form said hardened material; kneading the resultant mixture; in a second stage adding the remainder of the water necessary to form said hardened material; kneading the mixture to form granules having a diameter of mainly 0.5 to 50 mm; and treating the granules with steam at 40° to 100° C. under atmospheric pressure to obtain the hardened material.

2. A process according to claim 1, wherein the hardened material obtained by the atmospheric pressure steam treatment is crushed.

3. A process according to claim 1 wherein 5 to 20 parts by weight of a combustion ash having a quicklime content of 7.5 to 40 wt. % is mixed with 100 parts by weight of the granules.

4. A process according to claim 3 wherein the quicklime content is adjusted at 7.5 to 40 wt. % by adding quicklime to the combustion ash.

5. A process for producing hardened materials, which comprises adding water to a combustion ash comprising quicklime formed by combustion of a fluidized bed comprising coal as fuel and limestone as a desulfurizing agent; kneading the resultant mixture; controlling the slump of the mixture at 0.5 to 10 cm; cutting the kneaded mixture into pieces when the penetration resistance thereof becomes in the range of 5 to 20 kg by a hydration reaction; curing the pieces at ambient temperature until the penetration resistance is increased to 30 kg or more; and treating the pieces with steam at 40° to 100° C. under atmospheric pressure; and wherein the water is added in two stages wherein in the first stage water is added in an amount sufficient to slake said quicklime in said ash but insufficient to form said hardened material; then in a second stage adding a remainder of the water necessary to form said hardened material, wherein said two stage water addition operates to prevent the formation of cavities and reduction of strength of the hardened material.

6. A process according to claim 5 wherein quick-lime and/or slaked lime and calcium sulfate, are added to the combustion ash so that the composition thereof comprises 60 to 85% of coal ash, 10 to 25 wt. % of lime and, 5 to 25 wt % of calcium sulfate before or after the addition of water to the combustion ash.

7. A process according to claim 5 wherein the hardened material obtained after the atmospheric pressure steam treatment is crushed.

8. A process according to claim 5 wherein the combustion ash comprises ash discharged from the fluidized bed and mainly comprising coarse particles having a particle size of 0.2 mm or larger and a fly ash mainly comprising fine particles having a particle size of $200\mu$ or less; water is added to the discharged coarse ash to slake quick-lime contained therein; then the fly ash and water are added thereto; and the mixture is kneaded.

* * * * *